June 9, 1964   B. J. HAWKINS   3,136,074
EDUCATIONAL DEVICE
Filed Feb. 20, 1962   4 Sheets-Sheet 1
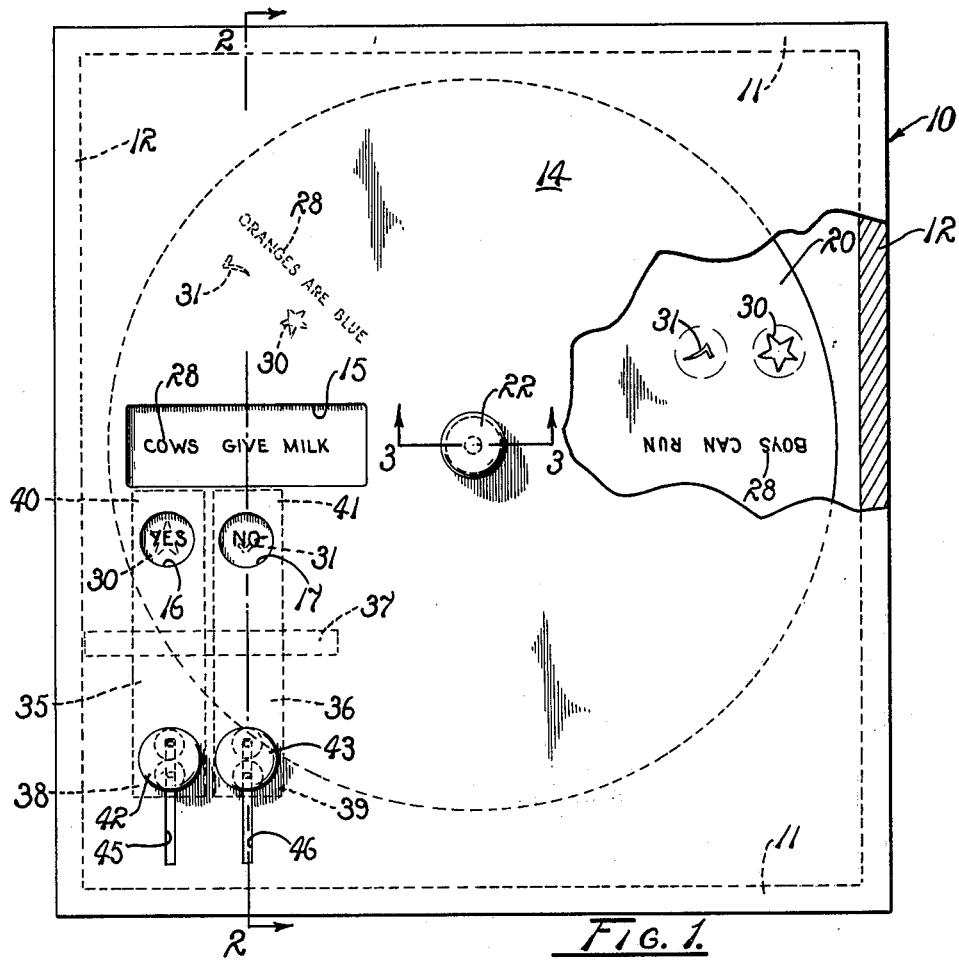
Fig. 1.
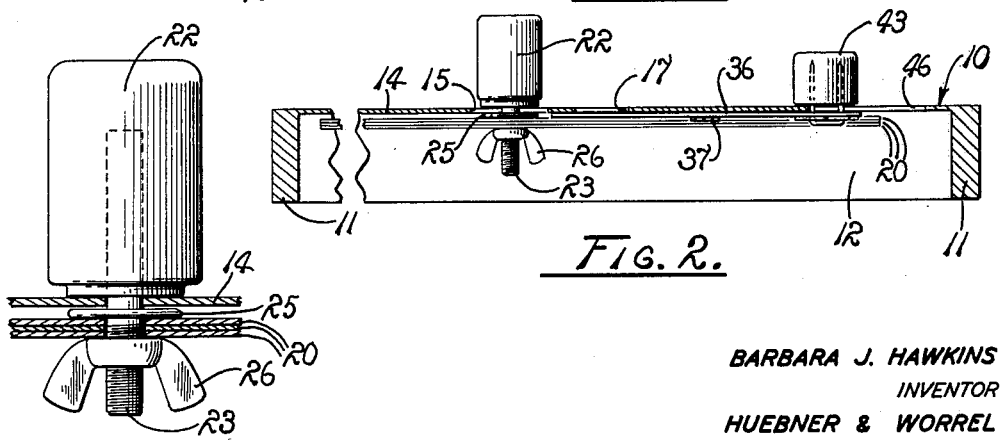
Fig. 2.
Fig. 3.
BARBARA J. HAWKINS
INVENTOR
HUEBNER & WORREL
ATTORNEYS
BY
Richard M. Worrel June 9, 1964  B. J. HAWKINS  3,136,074
EDUCATIONAL DEVICE Filed Feb. 20, 1962  4 Sheets-Sheet 2

BARBARA J. HAWKINS
INVENTOR
HUEBNER & WORREL
ATTORNEYS
BY
Richard M. Worrel

June 9, 1964     B. J. HAWKINS     3,136,074
EDUCATIONAL DEVICE

Filed Feb. 20, 1962     4 Sheets-Sheet 3

BARBARA J. HAWKINS
INVENTOR
HUEBNER & WORREL
ATTORNEYS
BY

June 9, 1964  B. J. HAWKINS  3,136,074
EDUCATIONAL DEVICE
Filed Feb. 20, 1962  4 Sheets-Sheet 4
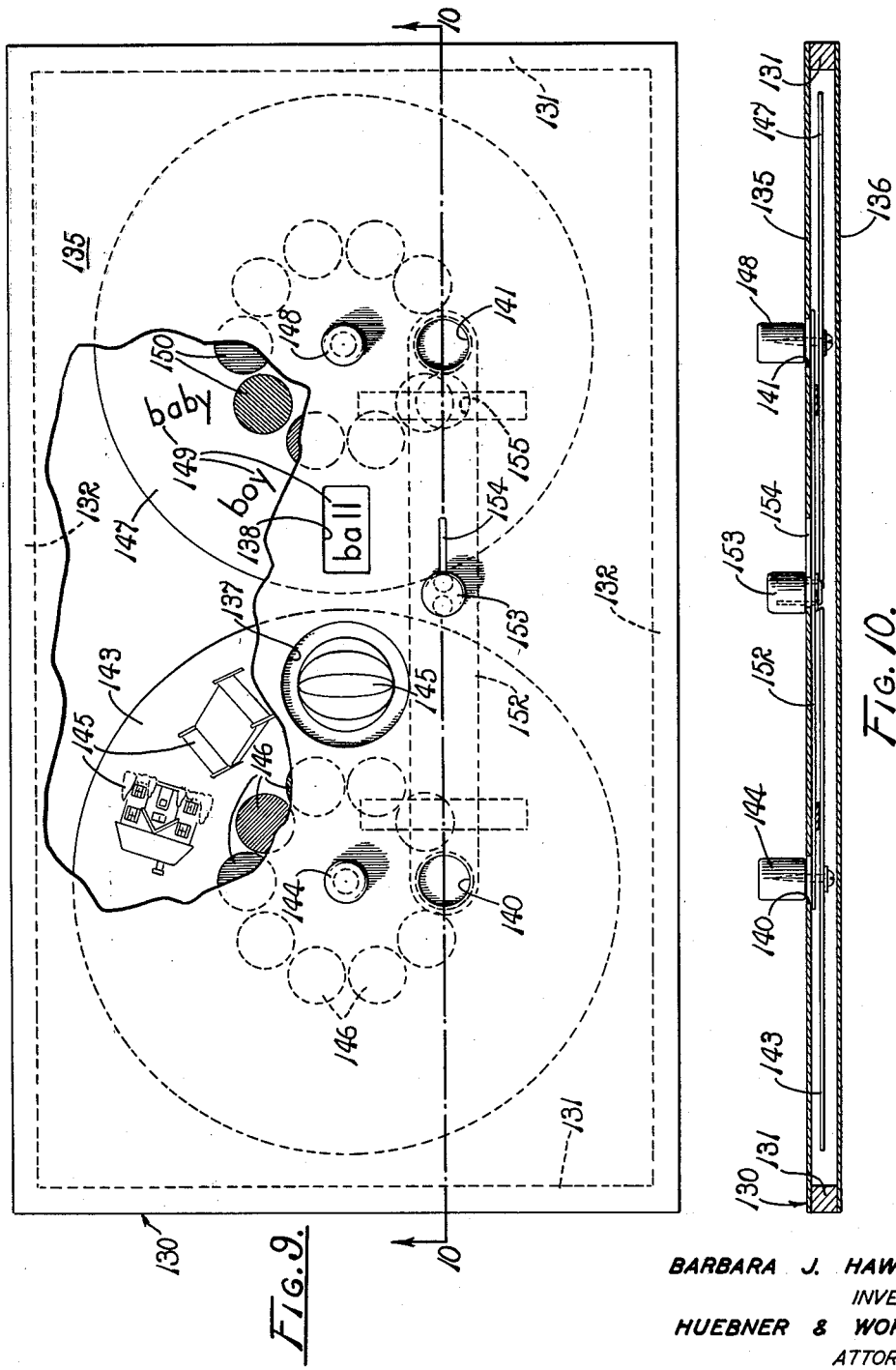
BARBARA J. HAWKINS
INVENTOR
HUEBNER & WORREL
ATTORNEYS
BY

United States Patent Office 3,136,074
Patented June 9, 1964

3,136,074
EDUCATIONAL DEVICE
Barbara J. Hawkins, 1622 Clinton Ave., Fresno, Calif.
Filed Feb. 20, 1962, Ser. No. 174,428
4 Claims. (Cl. 35—9)

The present invention relates to an educational device and more particularly to such a device providing a variety of pre-selectable problems and answers corresponding thereto by which a student may register an appropriate reaction to the problems. The invention further provides an answer checking mechanism operationally associated with the problem and answer portions thereof whereby the student can immediately determine the accuracy of his response.

Modern teaching methods frequency utilize mechanical educational devices to stimulate interest, to impart information, to facilitate drill, and to provide repetition of desired learning exercises. Particularly advantageous are such devices which students can employ effectively with a minimum of supervision and which provide intermediate evaluation of student reaction to problems presented. The subject invention relates to this general class of educational devices but seeks to overcome certain problems encountered therewith and to provide needed improvements.

Accordingly, it is an object of the present invention to provide an improved educational device for stimulating student interest in learning.

Another object is to provide an educational device by which students are self-taught with a minimum of instructional attention.

Another object is to provide such an educational device which has an answer checking mechanism whereby the student may have immediate visual evaluation of his reactions to selected problems.

Another object is to provide an educational device having a plurality of possible answers for individual problems which automatically registers the student's reaction and gives immediate verification of the accuracy of such reaction.

Another object is to provide such a device having answer checking indicia corresponding to selected problems which may be manipulated independently of the answer selecting portion of the device.

Another object is to provide an educational device providing an answer checking mechanism associated with both the problem portion and the answer portion of the device for indicating the accuracy of matches therebetween.

Another object is to provide an educational device that is simple to construct and is adapted to fabrication from economical materials such as cardboard, fiberboard, sheet plastic material and the like.

Other objects and advantages of the present invention will become more fully apparent in the following description in the specification.

In the drawings:

FIG. 1 is a front elevation of an educational device embodying the principles of the present invention with parts broken away for illustrative convenience.

FIG. 2 is a transverse vertical section of the educational device of FIG. 1 taken on line 2—2 of FIG. 1.

FIG. 3 is a somewhat enlarged fragmentary section of the problem manipulating handle of FIGS. 1 and 2.

FIG. 9 is a front elevation of a fifth form of the present invention with parts broken away for illustrative convenience showing a word and picture matching version.

FIG. 10 is a longitudinal vertical section of the fifth form taken on line 10—10 of FIG. 9.

Figure 4:
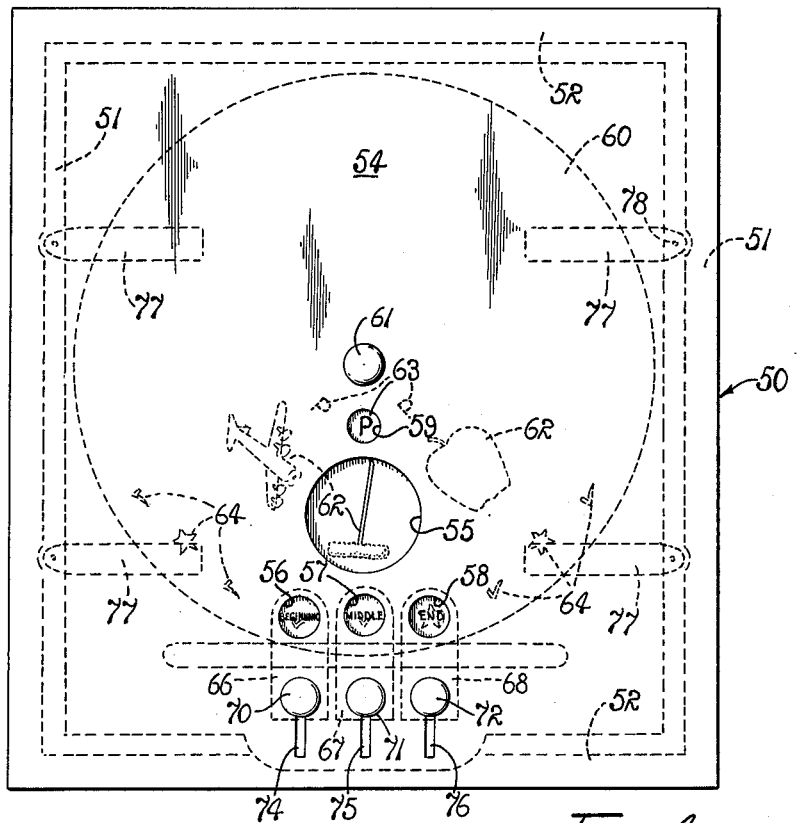
FIG. 4 is a front elevation of a second form of the present invention showing a phonetic teaching version.

Referring more particularly to the drawings, the educational device embodying the principles of the present invention conveniently provides a substantially square body member 10 having a pair of opposite side rail members 11 interconnected by a pair of opposite end rails 12 all of which support an opaque face panel 14. The rails and face panel are preferably constructed of a lightweight cardboard material but also may be formed of any other suitable material, such as fiberboard, sheet plastic, or the like. The face panel has formed therein a substantially rectangular problem window 15 adjacent to one of the side rails 11 and intermediate the opposite end rails 12. A pair of spaced circular answer windows 16 and 17 are formed in the face panel in juxtaposition to the problem window 15.

A circular problem disk 20 is adapted to be positioned within the body member 10 for rotation about a vertically disposed central axis by way of a problem manipulating handle 22. The handle includes a screw-threaded portion 23 which is extended through a suitable aperture in the face panel 14 adjacent to the problem window 15. A spacer 25 is positioned about the screw-threaded portion 23 adjacent to the face panel to space the handle and the problem disk therefrom a distance to permit free rotary movement of the handle and the disk. A wing nut 26 is screw-threadably received upon the screw-threaded portion 23 of the handle dependably to hold a plurality of disks 20 in assembled position thereon. With such arrangement the disks are easily stored and are readily interchangeable to provide a variety of problems.

Each of the disks 20 provides a plurality of circumferentially spaced problem indicia 28 thereon which preferably consist of random statements answerable by either yes and no or true and false responses. The problem indicia are selectively registerable and viewable through the problem window 15 of the face panel 14. The problem disks 20 also provide a plurality of spaced pairs of answer checking indicia 30 and 31 represented by a star and a check mark, respectively, which are spaced from the problem indicia a distance corresponding to the spacing between the problem window 15 and the answer windows 16 and 17. The star of the answer checking indicia 30 indicates a correct answer while the check mark of the answer checking indicia 31 indicates an incorrect answer. With proper manipulation of the problem disk 20 it is readily understood that the problem indicia 28 is viewable through the problem window 15 and the answer checking indicia 30 and 31 are concurrently viewable through their respective answer windows 16 and 17.

A pair of elongated substantially rectangular opaque shields 35 and 36 are constrained in sliding engagement between the problem disk 20 and the face panel 14 beneath the answer windows 16 and 17, respectively, by a strap 37 rigidly mounted on the inner surface of the face panel 14. Each of the shields provides opposite actuating and answer carrying ends 38—39 and 40—41, respectively. The answer carrying ends 40 and 41 provide "yes" and "no" answers, respectively, viewable through the answer windows 16 and 17. The opposite actuating ends 38 and 39 thereof individually mount manipulating knobs 42 and 43 by suitable connecting rods extended through a pair of spaced substantially parallel slots 45 and 46, respectively, in the face panel. With such arrangement, the shields 35 and 36 are movable between positions registering their answers with their respective answer windows for viewing therethrough and retracted positions uncovering the corresponding answer checking indicia 30 and 31, respectively.

*Second Form*

Figures 5, 6:
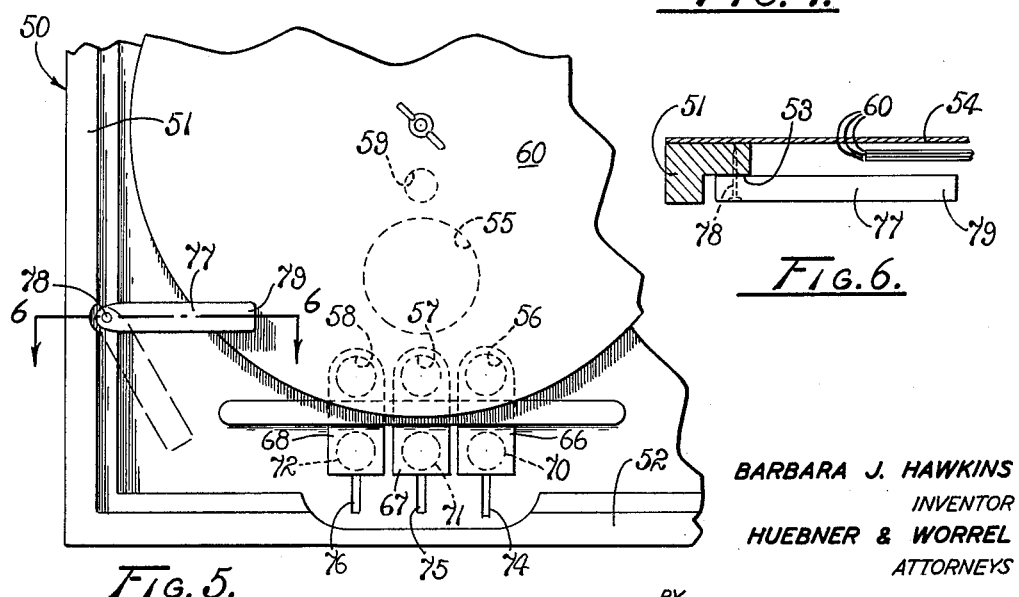
FIG. 5 is a somewhat enlarged fragmentary back elevation of the second form of FIG. 4.
FIG. 6 is a fragmentary section showing a problem card support member in side elevation.

Although the problem indicia have been described in the first form as providing random statements which may be answered by simple "yes" and "no" reactions, it will be obvious that certain departures may be made therefrom within the scope of the present invention. Accordingly, a second form of the invention is illustrated in FIGS. 4 through 6, inclusively, which adapts the first form of the invention to a phonetic teaching device providing three answer manipulating mechanisms along with corresponding answer checking indicia carried by the problem disk. The second form of the invention includes a substantially rectangular body member 50 providing a pair of opposite side rails 51 interconnected by a pair of opposite end rails 52. As best shown in FIG. 6, the end and side rails include a continuous shoulder portion 53 for reasons subsequently to be explained. An opaque face panel 54 is supported upon the side and end rails to include a problem window 55 therethrough centrally disposed intermediate the side rails 51 and somewhat below the longitudinal center of the body member 50. A plurality of equally horizontally spaced answer windows 56, 57 and 58 are disposed in juxtaposition to the problem window 55 and between the problem window and the adjacent end rail 52. An auxiliary problem window 59 is formed through the face panel between the main problem window 55 and the longitudinal center of the body.

A problem disk 60 is rotatably mounted in underlying relation to the opaque face panel 54 and has an outer periphery disposed in juxtaposition to the answer windows between the answer windows and the adjacent end rail 52. The problem disk provides a central control knob 61 and a plurality of circumferentially arranged problem indicia 62 thereon which in this embodiment represents pictorial objects to be identified. Upon rotation of the problem disk 20, the problem indicia 62 are individually selectively viewable through the problem window 55. A plurality of circumferentially arranged auxiliary problem indicia 63 are carried on the problem disk in spaced relation to corresponding primary problem indicia 62 to be viewable through the auxiliary problem window 59. As herein shown, the auxiliary problem indicia is represented by an appropriate letter of phonetic symbol to be found within the name of the primary problem indicia 62.

A plurality of groups of three answer checking indicia, generally indicated by the reference numeral 64, are circumferentially arranged on the problem disk 60 closely adjacent to the outer periphery thereof for viewing through the answer windows 56, 57 and 58. As in the first form, the star denotes a correct answer whereas the check denotes a wrong answer. A plurality of elongated substantially rectangular opaque shields 66, 67 and 68 are mounted in transversely spaced relation on the underside of the face panel 54 beneath the problem windows 56, 57, and 58, respectively. Each shield includes an actuating knob 70, 71 and 72 which is extended through individual slots 74, 75 and 76 in the face panel for manipulation of their respective shields. The shields 66, 67 and 68 individually have the words "Beginning," "Middle" and "End," respectively, printed thereon which are viewable through their respective answer windows 56, 57 and 58 when the shields are in a position covering the answer checking indicia 64. The words are thereby selectable by manipulation of their respective shields to select which portion of the name of the article viewed in the problem window the phonetic sound viewable in the auxiliary problem window is found.

The dimensional size of the second form is substantially larger than the first form inasmuch as the problem indicia of the problem disk are necessarily larger. With the problem card formed of a relatively lightweight material, the periphery thereof may tend to sag or fall away from the problem and answer checking windows 55 and 56–57–58, respectively, making observation thereof difficult. To overcome such problem, a pair of support fingers 77 are pivotally mounted in longitudinal spaced relation on the shoulder 53 of each of the side rails 51 by a pin or nail 78. The fingers provide inwardly extended ends 79 which underlie the problem disk in supporting relation thereto. When it is desired to replace or change the problem disk 60, the inner ends 79 of the fingers are easily swung to a retracted position adjacent their respective mounting rails 51.

*Operation of the First and Second Forms*

In the first form of the invention, the control handle 22 is manipulated to rotate the problem disk 20 to a position registering the problem indicia 28 with the problem window 15. Such positioning also disposes the answer checking indicia 30 and 31 beneath their respective answer windows 16 and 17 which are covered by their respective answer shields 35 and 36. If the student believes the statement represented by the problem indicia 28 to be correct he actuates the control knob 42 of the shield 35 to a retracted position opening the "yes" answering window 16. With such movement, the answering checking indicia star 30 representing a correct answer is immediately uncovered to provide the student with a ready determination of the accuracy of his answer. On the ohter hand, if the student believes that the statement presented by the problem indicia is incorrect or false, the control knob 43 of the shield 36 is manipulated to uncover the answer checking indicia 31 indicating that the student's response is incorrect. This not only provides the student with an opportunity for practicing a learning exercise but personally to verify his answers immediately so that faulty memory bonds can promptly be corrected. The proper answer indicia is provided in such near proximity to the problem indicia that a single visual expression is made of the problem and appropriate answer conducive to rapid learning.

The operation of the second form is basically similar to that just described for the first form in that the answering shields 66, 67 and 68 can be manipulated for immediate verification of the answer selected. In this form, the problem disk 60 is rotated to register a problem indicia 62 for viewing through the problem window 55 which as shown is represented by the picture of a mop. At the same time, the phonetic auxiliary problem indicia 63 represented by the letter "P" is viewable through the auxiliary problem window 59, the location of which in the name "mop" is to be determined. The student's reaction to such problem may then be recorded by manipulation of one of the answering shields covering the answer windows 56, 57 and 58. If the student believes the phonetic sound of the letter "P" of the auxiliary problem indicia is to be found at the end of the name of the article in the problem window, the control knob 72 is manipulated to a retracted position uncovering the answer windown 58. Such movement exposes the star of the answer checking indicia 64 to give immediate verification of the accuracy of his answer. In this instance, manipulation of either of the control knobs 70 or 71 to a retracted position uncovers a respective answer window to expose the check mark of the answer checking indicia 64 indicating an incorrect answer.

*Third Form*

Figure 7:
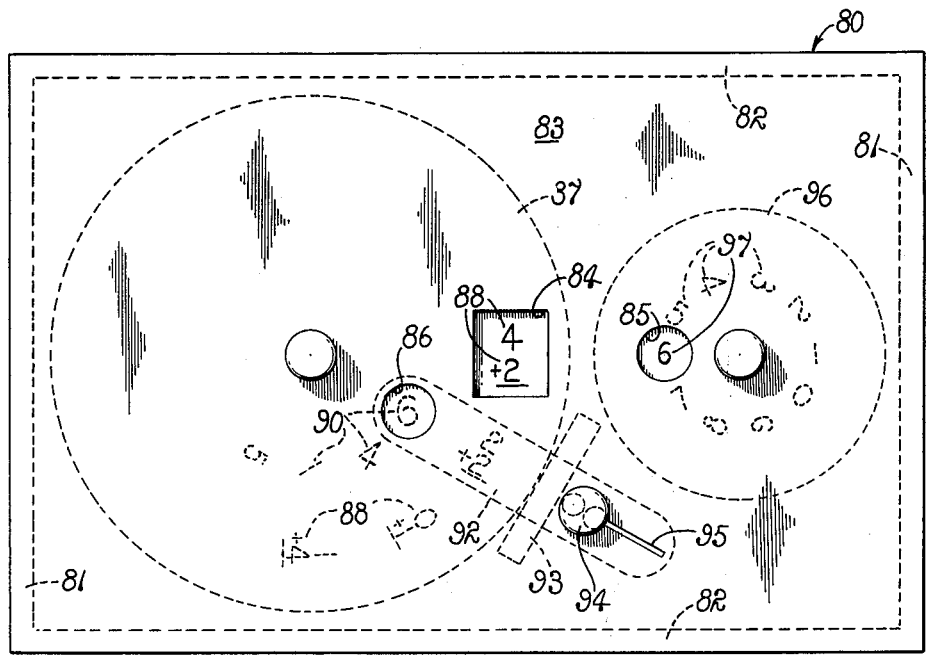
FIG. 7 is a front elevation of a third form of the present invention showing an arithmetic teaching version.

The third form of the present invention is illustrated in FIG. 7. This form represents an arithmetic teaching device having a body member 80 providing pairs of interconnected opposite end and side rails 81 and 82, respectively. The rails mount an opaque face panel 83 thereon through which is provided a problem window 84, an answer window 85 and an answer checking window 86. A problem disk 87 is rotatably mounted in underlying relation to the face panel 83 and has a plurality of circumferentially arranged problem indicia 88 thereon individually selectively registrable and viewable through the problem window 84. A plurality of answer checking indicia 90 are also mounted on the problem disk 87 for registration with and viewing through the problem checking window 86. An elongated opaque shield 92 is slidably mounted in covering relation to the answer checking window 86 by a strap 93 rigidly connected to the face panel 83. The shield is manipulated by way of a control knob 94 extended through a longitudinally extended slot 95 in the face panel 83. An answer disk 96 is rotatably mounted in the body and has a plurality of answer indicia 97 thereon which are selectably positionable to be viewed through the answer window 85 of the face panel. In this form of the invention, it is readily apparent that the answer disk 96 provides a greater number of possible answers to any particular problem presented by the problem disk 87 than was possible with the first and second forms of the invention.

*Fourth Form*

Figure 8:
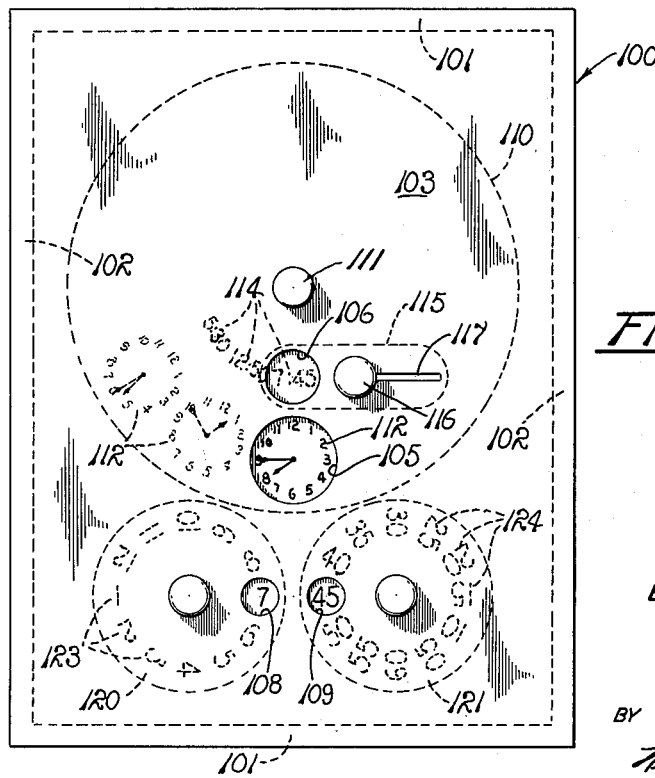
FIG. 8 is a front elevation of a fourth form of the present invention showing a clock or time teaching version.

A fourth form of the invention is illustrated in FIG. 8 as providing a time teaching device which is basically similar to the third form of the invention as described above. In this form, there is provided a substantially rectangular body member 109 having pairs of opposite end and side rails 101 and 102. The end and side rails support an opaque face panel 103 through which is formed a problem window 105, an answer checking window 106 and a pair of spaced answer windows 108 and 109. A problem disk 110 having a control knob 111, is rotatably mounted in the body and includes a plurality of problem indicia 112 thereon which are representative of a clock face with the hands disposed to represent different times. A plurality of answer checking indicia 114 are also arranged on the problem disk to be viewable through the answer checking window 106. The answer checking indicia 114 thereby correspond to the problem indicia concurrently viewable therewith.

An elongated substantially rectangular opaque shield 115 is slidably mounted in the face panel in covering relation to the window 106. The shield is manipulated by a control knob 116 extended through a longitudinally extended slot 117 in the face panel 103. A pair of answer disks 120 and 121 are rotatably mounted in the body with each respectively providing numbered answer indicia 123 and 124 thereon for viewing through their respective answering windows 108 and 109. In this form the two answer disks are necessary to provide for separate selection of numbers corresponding to the hour and minute hands of the problem indicia 112 represented by the answer indicia 123 and 124, respectively.

*Operation of the Third and Fourth Forms*

The operation of the third and fourth forms of the invention is quite similar to the operation of the first and second forms of the invention. In the third form, the answer disk 96 is manipulated to register a suitable answer through the answer window 85 which the student believes to correspond to the problem presented by the problem indicia 88 in the problem window 84. After such answer is selected, its accuracy is immediately determinable by manipulation of the control knob 94 to slide the shield 93 to a retracted position opening the answer checking window 86 to expose the answer checking indicia 90 therein which corresponds to the problem present in the problem window 84. If desired, the shield 93 can be left in a retracted position so that the problem checking window 86 remains open for practice in associating the correct answer with each particular problem presented in the problem window 84.

The fourth form of the invention is particularly adapted for teaching students how to tell time although its operation is substantially identical to that of the third form described above. The only change is the necessity of having a pair of answer disks 120 and 121 for individual selection of the hour and minute hands of the clock. In this form, a clock face is viewable through the problem window 105. The student records his reaction to such problem by manipulation of the answer disks 120 and 121 with the accuracy of such answers being immediately verified by manipulation of the control knob 116 to slide the shield 115 to a retracted position uncovering the correct answer checking indicia 114.

*Fifth Form*

A fifth form of the present invention is illustrated in FIGS. 9 and 10 having an elongated rectangular body member 130 similar to the body members 10, 50, 80 and 100 of the preceding forms of the invention. The body includes pairs of opposite end and side rails 131, 132, respectively, to support a pair of opposite face and back panels 135 and 136, respectively. The face panel provides a problem window 137 and a closely adjacent answer window 138. A pair of answer checking windows 140 and 141 are formed through the top panel individually adjacent to the problem and answer windows 137 and 138, respectively. A problem disk 143 having a control knob 144, is rotatably mounted in underlying relation to the face panel and problem window 137. The problem disk has a plurality of problem indicia 145 representing varied pictured objects mounted thereon which are selectively viewable through the problem window. A plurality of answer checking indicia 146 of circular differently colored panes are also carried on the problem disk and are viewable through the answer checking window 140.

An answer disk 147 having a control knob 148, is rotatably mounted in the face panel 135. The answer disk mounts a plurality of answer indicia 149 thereon which are selectively registerable with and viewable through the answer window 138. A plurality of answer checking indicia 150 of circular differently colored panels are concentrically mounted thereon in position to be viewed through the answer checking window 141. An elongated transversely extended opaque shield 152 is slidably mounted on the underside of the face panel 134 between a position covering the answering checking windows 140 and 141 and a retracted position permitting visual inspection of the answer checking indicia 146 and 150, respectively aligned therewith. A control handle 153 is connected to the shield intermediate the ends thereof to extend through an elongated slot 154 in the face panel to accommodate such movement between its covering and retracted positions. The shield 152 also provides a circular opening 155 therethrough adjacent to the answer checking window 141. The opening 155 is registerable with the window 141 with movement of the shield to the right as viewed in FIG. 9 which movement also opens the answer checking window 140.

*Operation of the Fifth Form*

The operation of the fifth form of the invention is basically similar to the preceding four forms of the invention. This form utilizes the matching principle of teaching wherein the object pictured by the problem indicia 145 is intended to be matched with its appropriate name of the answer indicia 149. When a proper match has been made between the problem indicia 145 and the answer indicia 149, the shield 152 is retracted to open the answer checking windows 140 and 141 whereupon similarly colored panels of the answer checking indicia 146 and 150 are visible. If a proper match is not made, the colors are sufficiently distinct so as to provide immediate appraisal of the inaccuracy of the attempted match. Also, in this form, the problem and answer disks may be reversed in operation so that a word is positioned in the appropriate opening to present the problem of selecting the proper article to be matched therewith. The operation of the answer checking indicia will, of course, remain constant by the positioning of identically colored panels in the answer checking windows when a proper match has been made.

The devices of the present invention are economical to produce and are conveniently fabricated from cardboard, fiberboard, opaque plastic sheet material or the like and require no glass or other brittle material in the construction thereof which may constitute a hazard to children.

The educational devices have the interest motivating characteristics of a game and are adapted to a wide range of learning exercises and student interest. Repetitious practice of learning exercises is facilitated and the practice of errors minimized by the provision of prompt and convenient answer evaluation. Each form makes possible efficient learning experiences with minimum supervision. When used in organized teaching facilities, the devices are effective to free the instructors so they may devote greater attention to individual students.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An educational device comprising a body member having a problem window and an answer window, and answer checking windows adjacent to said problem and answer windows; a problem disk rotatably mounted within the body member having problem indicia and answer checking indicia thereon registerable with the problem window and the adjacent answer checking window respectively; an answer disk rotatably mounted in the body member having answering indicia and answer checking indicia thereon registerable with the answer window and the adjacent answer checking window respectively; and concealing means reciprocably mounted in said body member between said answer checking windows and said disks for movement between a position covering said answer checking indicia, and a retracted position whereby the answer checking indicia are visible through their respective windows.

2. An educational device comprising a body member providing a face panel having a problem window, at least a pair of answer windows, and spaced substantially parallel elongated slots aligned with the answer windows; a control handle rotatably mounted on said face panel; a disk concentrically mounted on said control handle having problem indicia and answer checking indicia thereon registrable with the problem window and said answer windows respectively; at least a pair of elongated opaque shields slidably mounted on the face panel in superimposed relation to said disk and having answer indicia thereon registrable with said answer windows when disposed in covering relation to said answer checking indicia on the disk; and control means extended through said slots in said face panel having positioning connection to said shields whereby the shields are retractable for visual inspection of said answer checking indicia through the answer windows.

3. An educational device comprising a body member providing a face panel having formed therethrough a problem window, an answer window, a pair of answer checking windows individually adjacent to said problem and answer windows, and an elongated slot extended intermediate said answer checking windows; a problem control knob rotatably mounted on said face panel; a problem disk concentrically carried on the control knob having problem indicia and answer checking indicia thereon registrable with the problem window and the answer checking window respectively; an answer control knob rotatably mounted on the face panel in spaced relation to said problem control knob; an answer disk concentrically carried on said answer control knob having answer indicia and answer checking indicia thereon registrable with said answer window and the adjacent answer checking window respectively; an elongated opaque shield having opposite ends longitudinally slidably mounted on the face panel in superimposed relation to said problem disk and to said answer disk in covering relation to the answer checking indicia thereon; and control means extended through said slot in the face panel having positioning connection to the shield whereby the same is retractable for visual inspection of the answer checking indicia through the opposite answer checking windows.

4. An educational device comprising a body member providing a face panel having a problem window, an answer window, a pair of answer checking windows individually adjacent to said problem and answer windows respectively, and an elongated slot extended intermediate said answer checking windows; a problem control knob rotatably mounted on said face panel; a problem disk concentrically carried on the control knob having problem indicia arranged concentrically thereon and registrable with the problem window and having answer checking indicia arranged concentrically thereon at a radius different from said problem indicia and being registrable with one of the answer checking windows; an answer control knob rotatably mounted on the face panel in spaced relation to said problem control knob; an answer disk concentrically carried on said answer control knob having answer indicia arranged concentrically thereon and registrable with said answer window and having answer checking indicia corresponding to the answer checking indicia on the problem disk, arranged concentrically relative to the answer indicia but at a different radius, and being registrable with the other of the answer checking windows; an elongated opaque shield having opposite ends longitudinally slidably mounted on the face panel in superimposed relation to said problem disk and to said answer disk in covering relation to the answer checking indicia thereon; and control means extended through said slot in the face panel having positioning connection to the shield whereby the same is retractable for visual inspection of the answer checking indicia through the opposite answer checking windows.

References Cited in the file of this patent
UNITED STATES PATENTS

| 1,829,295 | Phagans | Oct. 27, 1931 |
| 2,628,435 | Minninger et al. | Feb. 17, 1953 |
| 2,924,025 | Salisbury et al. | Feb. 9, 1960 |

FOREIGN PATENTS

| 712,342 | Great Britain | July 21, 1954 |